(12) United States Patent
Doolittle et al.

(10) Patent No.: US 9,341,533 B2
(45) Date of Patent: May 17, 2016

(54) AIR DATA PROBES

(71) Applicant: Rosemount Aerospace Inc., Burnsville, MN (US)

(72) Inventors: Charles Jae Doolittle, Minneapolis, MN (US); Brian Daniel Matheis, Lakeville, MN (US); Roger Duane Foster, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 114 days.

(21) Appl. No.: 14/183,665

(22) Filed: Feb. 19, 2014

(65) Prior Publication Data
US 2014/0251000 A1 Sep. 11, 2014

Related U.S. Application Data

(60) Provisional application No. 61/772,994, filed on Mar. 5, 2013.

(51) Int. Cl.
*G01L 15/00* (2006.01)
*G01P 5/165* (2006.01)

(52) U.S. Cl.
CPC ............... *G01L 15/00* (2013.01); *G01P 5/165* (2013.01)

(58) Field of Classification Search
None
See application file for complete search history.

(56) References Cited

U.S. PATENT DOCUMENTS

| | | | |
|---|---|---|---|
| 3,512,414 A | 5/1970 | Rees | |
| 3,952,577 A * | 4/1976 | Hayes et al. | 73/54.04 |
| 4,378,697 A | 4/1983 | DeLeo et al. | |
| 5,313,700 A | 5/1994 | Dorman | |
| 5,811,691 A * | 9/1998 | Jackson | 73/861.65 |
| 6,547,678 B2 | 4/2003 | Barfield | |
| 7,128,666 B2 | 10/2006 | Veilleux et al. | |
| 7,379,839 B2 | 5/2008 | Cronin et al. | |
| 2006/0056489 A1 | 3/2006 | Bernard et al. | |
| 2010/0039336 A1 | 2/2010 | Yasin et al. | |
| 2011/0262705 A1 | 10/2011 | Gupta et al. | |
| 2014/0251000 A1 | 9/2014 | Doolittle et al. | |
| 2014/0251001 A1* | 9/2014 | Doolittle et al. | 73/178 R |
| 2015/0103864 A1 | 4/2015 | Schwie et al. | |

FOREIGN PATENT DOCUMENTS

| | | |
|---|---|---|
| EP | 2407671 A1 | 1/2012 |
| GB | 1066935 A | 4/1967 |
| GB | 1413990 A | 11/1975 |

(Continued)

OTHER PUBLICATIONS

White, F. M., "The Stability of Laminar Flow", Viscous Fluid Flow, 3rd ed., McGraw Hill, New York, 2006, 5 pages.

(Continued)

*Primary Examiner* — Andre Allen
(74) *Attorney, Agent, or Firm* — Locke Lord LLP; Scott D. Wofsy; Alicia J. Carroll

(57) ABSTRACT

An air data probe includes a probe head defining a longitudinal axis with a forward tip, and a turbulence inducing surface defined in the probe head aft of the forward tip. The turbulence inducing surface is configured and adapted to trip a fluid boundary layer passing over the probe head to transition from laminar to turbulent to control or reduce boundary layer separation resulting in consistent readings at high altitudes.

16 Claims, 2 Drawing Sheets

(56) References Cited

FOREIGN PATENT DOCUMENTS

| | | |
|---|---|---|
| GB | 2490170 A | 10/2012 |
| JP | 2006009976 A | 1/2006 |

OTHER PUBLICATIONS

Dutton, R. A., "The Accuracy of measurement of Turbulent Skin Friction by Means of Surface Pitot-Tubes and the Distribution of Skin Friction on a Flat Plate", Aeronautical Research Council Reports and Memoranda, London, 1957, 20 pages.

European Search Report dated Jun. 2, 2014 issued in EP Application No. 14157823.7.

Harris, et al., eds., "Harris'Shock and Vibration Handbook", 5th Edition, 2002, Chapter 29, 69 pages.

Extended European Search Report dated Mar. 27, 2015, issued on corresponding European Patent Application No. 14189054.1, 8 pages.

Extended European Search Report dated Jul. 21, 2015, issued on corresponding European Patent Application No. 15168478.5, 6 pages.

Communication pursuant to Article 94(3) EPC dated Oct. 22, 2015, issued on corresponding European Patent Application No. 14 157 823.7, 7 pages.

* cited by examiner

AIR DATA PROBES

CROSS-REFERENCE TO RELATED APPLICATIONS

This application claims priority to U.S. Provisional Patent Application No. 61/772,994 filed Mar. 5, 2013, which is incorporated by reference herein in its entirety.

BACKGROUND OF THE INVENTION

1. Field of the Invention

The present invention relates to air data probes and more particularly to air data probes for aerospace applications.

2. Description of Related Art

A variety of air data probe devices are known in the art for aircraft flight control. Of such devices, many are directed to measuring Pitot pressure, static pressure, local angle of attack pressures, and angle of sideslip pressures as parameters for calculating pressure altitude, altitude rate, airspeed, Mach number, angle of attack, and angle of sideslip. The air data probe typically includes one or more static pressure ports located on the side of the probe head integral to the probe's surface which sense the atmospheric pressure outside of the aircraft. When these static pressure ports take consistent pressure measurements, they can provide accurate and consistent calculations of the above mentioned parameters.

During periods where an air data probe is at a high altitude, angle of attack, and/or Mach number, it is possible for the air data probe to have inconsistent measurement errors in the aft static ports. There can be considerable variations from one probe to another, suggesting there is a sensitivity to an unknown manufacturing variable at the conditions described above.

Such conventional methods and systems generally have been considered satisfactory for their intended purpose. However, there remains an ever present need to advance the state of the art by reducing data inconsistencies in air data probes at high altitude, Mach, and/or angle of attack. There also remains a need in the art for such methods and systems that are easy to make and use. The present invention provides a solution for these problems.

SUMMARY OF THE INVENTION

The subject invention is directed to a new and useful air data probe. The air data probe includes a probe head defining a longitudinal axis with a forward tip, and a turbulence inducing surface defined in the probe head aft of the forward tip. The turbulence inducing surface is configured and adapted to trip a fluid boundary layer passing over the probe head to transition from laminar to turbulent to control or reduce boundary layer separation resulting in consistent readings at high altitudes.

In one embodiment of the subject invention, the turbulence inducing surface can be defined proximate the forward tip. It is also contemplated that the air data probe can include a first static port or ports proximate the forward tip and a second static port or ports aft the first static port or ports. The turbulence inducing surface can be defined between the first and second static port location and can be an annular depression around the probe head. The turbulence inducing surface can be configured and adapted to trip a fluid boundary layer, as an example, at an altitude of approximately 45,000 feet (13,716 meters), at a speed of approximately Mach 0.9, and/or at an angle of attack of approximately 10 degrees. The annular depression can be defined in a lateral plane, wherein the lateral plane is perpendicular to the longitudinal axis. The annular depression can have a generally constant geometry around the probe head. Those having skill in the art will readily appreciate that these features may also be beneficial at other flight conditions.

In certain embodiments, the turbulence inducing surface includes a serrated surface defined in the probe head aft of the forward tip. The serrated surface is configured and adapted to trip a fluid boundary layer, as described above with reference to the turbulence inducing surface.

In another aspect, the serrated surface can include at least one of peaks, raised features, and valleys, which together are representative of distributed roughness elements. The serrated surface can include serration cuts at opposing angles, wherein the serration cuts have a generally constant geometry. The serrated surface can be arranged circumferentially around the probe head, in a strip, and/or in opposing strips. The strip can also be defined along a surface of the probe head in an axial direction. The strip can be defined along a surface of the probe head in an axial direction 90 degrees from the static ports, circumferentially, and/or the serrated surface can extend from proximate the forward tip to an axial location proximate that of the second static port.

These and other features of the systems and methods of the subject invention will become more readily apparent to those skilled in the art from the following detailed description of the embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, embodiments thereof will be described in detail herein below with reference to certain figures, wherein.

DETAILED DESCRIPTION OF THE PREFERRED EMBODIMENTS

Figure 1:
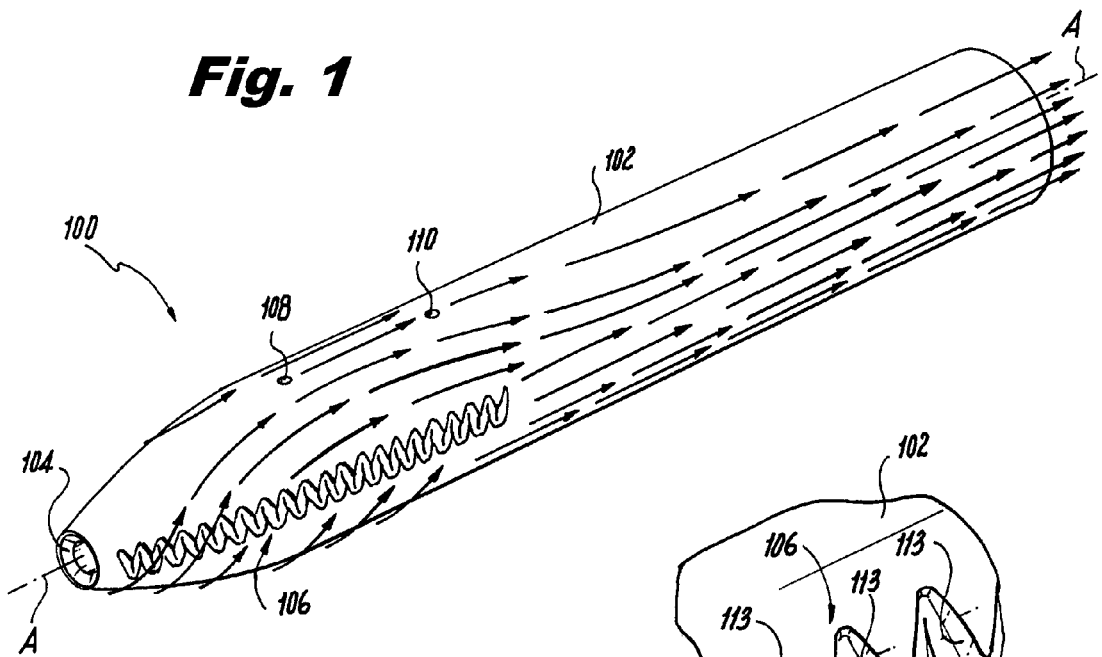
FIG. 1 is a perspective view of an exemplary embodiment of an air data probe constructed in accordance with the present invention, showing a serrated surface and a schematic depiction of the air flow over the air data probe.

Reference will now be made to the drawings wherein like reference numerals identify similar structural features or aspects of the subject invention. For purposes of explanation and illustration, and not limitation, a partial view of an exemplary embodiment of the air data probe in accordance with the invention is shown in FIG. 1 and is designated generally by reference character 100. Other embodiments of air data probes in accordance with the invention, or aspects thereof, are provided in FIGS. 2-5 as will be described.

Referring now to FIG. 1, air data probe 100 includes a probe head 102 defining a longitudinal axis A with a forward tip 104, and a turbulence inducing surface, shown in FIG. 1 as a serrated surface 106, defined in probe head 102 aft of forward tip 104. Turbulence inducing surface is configured and adapted to trip a fluid boundary layer passing over probe head 102 to transition from laminar to turbulent for reducing or controlling boundary layer separation for consistent readings at low Reynolds number (Re) flight conditions, high altitudes, angle of attack and/or high Mach number.

With further reference to FIG. 1, the forward end of serrated surface 106 is defined proximate forward tip 104. Air data probe 100 includes a first static port 108 proximate and aft of forward tip 104 and a second static port 110 aft first static port 108. Serrated surface 106 is configured and adapted to trip turbulence in a fluid boundary layer at low Re flight conditions, on the order of $10^5$ and at a speed of approximately Mach 0.9. At angle, these conditions create a crossflow as depicted schematically by the flow arrows in FIG. 1. The serrated surface 106 trips turbulence in the boundary layer of the flow crossing it in these conditions to reduce boundary layer separation in the vicinity of static ports 108 and 110. While air data probe 100 is illustrated with only one first and second static port 108, 110, respectively, those skilled in the art will readily appreciate that additional static ports can be arranged on probe head 102 in any suitable position for a given application.

Figure 2:
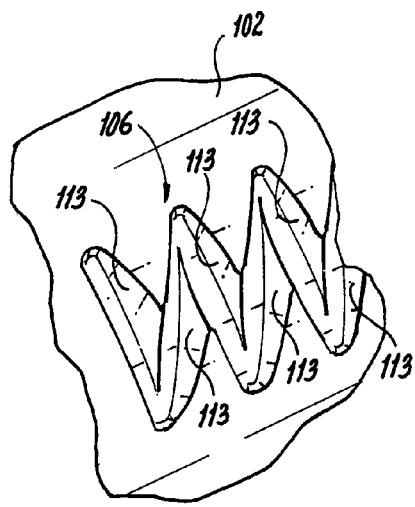
FIG. 2 is an enlarged perspective view of a portion of the air data probe of FIG. 1, showing the serrated surface, including serration cuts at opposing angles.

With reference now to FIGS. 1 and 2, serrated surface 106 is arranged in a single strip and includes serration cuts 113 at opposing angles, wherein serration cuts 113 have a generally constant geometry. The strip is defined along a surface of probe head 102 in an axial direction relative to axis A. In the circumferential direction, serrated surface 106 is 90 degrees from static ports 108 and 110. Serrated surface 106 extends from proximate forward tip 104 aft to an axial position proximate that of second static port 110. Although serrated surface 106, as shown in FIGS. 1 and 2, is shown as a single strip, those skilled in the art will readily appreciate that an opposed serrated surface can be defined along a surface of probe 102 on the opposite side from serrated surface 106. Those skilled in the art will also readily appreciate that serrated surfaces can be arranged circumferentially around probe head 102, or in any suitable position for a given application.

Figure 3:
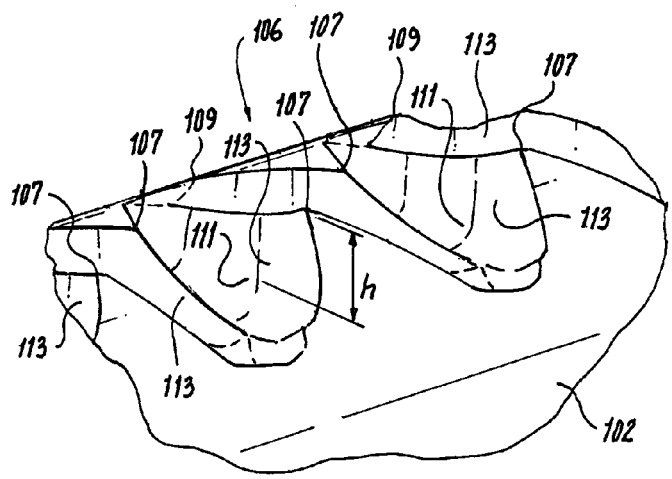
FIG. 3 is an enlarged perspective view of a portion of the air data probe of FIG. 1, showing features of the serration cuts, including peaks, raised features, and valleys.

With reference now to FIG. 3, serrated surface 106 includes peaks 107, raised features 109, and valleys 111, which combined are representative of distributed roughness elements, and the like. Those skilled in the art will readily appreciate that peaks 107 are directly representative of vortex generators which can cause diverging boundary layers to significantly increase stream wise voracity, a known catalyst for transition from laminar to turbulent. Further, regions of the flow field that do not immediately interact with peaks 107 will follow into the crossover region of opposing serration cuts 113 where raised features 109 are immediately met downstream.

Periodic features, e.g. distributed roughness elements, produced by alternating peaks 107 and valleys 111, are developed by maintaining constant parameters defining serration cuts 113. Those having skill in the art will also readily appreciate that a serrated surface, e.g. serrated surface 106, can be manufactured in a secondary machining process in which a ball end-mill tool is used to produce crossing cuts along the curved surface defining a probe head profile, e.g. probe head 102. Manufacturing of the serrated surface only removes material, so it does not require changing the probe head primary machining process.

Those having skill in the art will further appreciate that cutting at large angles with respect to the probe centerline allows for a gradual increase in cut depth laterally across the probe head. The incoming boundary layer, therefore, remains fairly undisturbed until reaching protrusions, e.g. raised features 109 formed by the initial cross cuts, or peaks 107, formed by cross cuts with a ball end-mill at an opposing orientation, where the opposing cuts merge together. The protrusions interact with higher speed regimes of the boundary layer, something which simple surface cuts cannot accomplish.

Parameters affecting the cuts include the ball end-mill diameter, cut angle, consecutive cut offset, opposing cut offset, and cut depth with respect to the probe head profile. Those skilled in the art will readily appreciate that by systematically varying these parameters the features discussed above can be analyzed and optimized for specific applications. For example, the lateral width of the serrated surface and periodicity and effective height, h, shown in FIG. 3, of peaks 107 are three parameters that can be adjusted to optimize performance. Those skilled in the art will readily appreciate that effective height, h, is the radial distance from the base of valley 111 to adjacent peak 107, therein indicating the maximum depth valley 111 can reach with respect to the original probe head surface.

Figure 4:
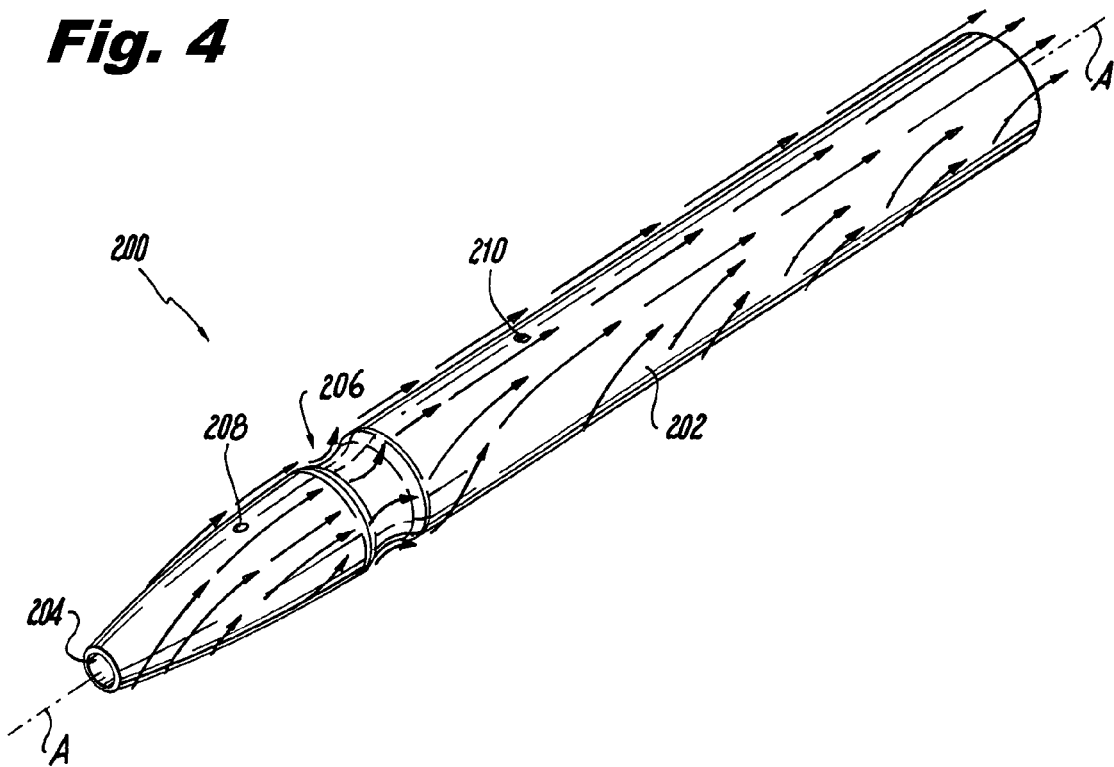
FIG. 4 is a perspective view of another exemplary embodiment of an air data probe constructed in accordance with the present invention, showing an annular depression around the probe head and a schematic depiction of the air flow over the air data probe.
Figure 5:
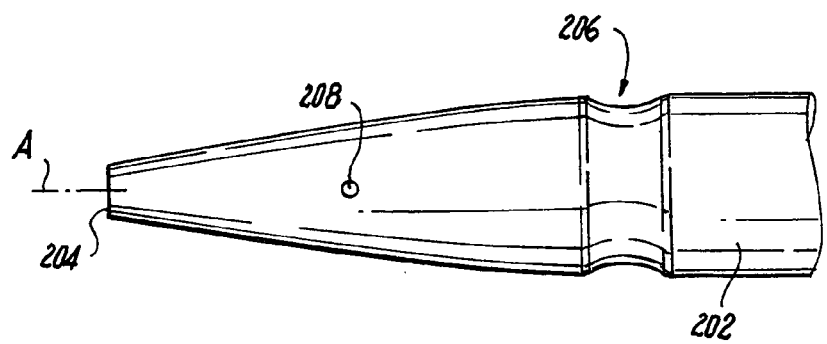
FIG. 5 is an enlarged plan view of a portion of the air data probe of FIG. 4, showing the annular depression and a forward static port.

Referring now to FIGS. 4 and 5, another exemplary embodiment of an air data probe 200 includes turbulence inducing surface in the form of an annular depression 206 around a probe head 202. Annular depression 206 is defined in probe head 202, aft forward tip 204 between first and second static ports, 208 and 210, respectively. Annular depression 206 is configured and adapted to trip a fluid boundary layer, much as described above. Annular depression 206 is shown defined in a lateral plane. The lateral plane is perpendicular to longitudinal axis A, and annular depression 206 has a generally constant geometry around probe head 202. Annular depression 206 is configured and adapted to trip a fluid boundary layer at altitude, speed, and angle of attack conditions as described above with reference to serrated surface 106. Those skilled in the art will readily appreciate that while annular depression 206 extends all the way around the circumference of probe head 202, it is also possible to use an annular depression that extends only partially around a probe head.

With further reference to FIGS. 4 and 5, as air flows over probe head 202, shown schematically from left to right in FIG. 4, a laminar boundary layer develops along the increasing diameter of probe head 202. Upon reaching a feature, e.g. annular depression 206, an adverse pressure gradient is experienced by the laminar boundary layer, at which time it is expected to transition to a turbulent state. Once a fully developed turbulent boundary layer is formed it continues along the surface of the probe until reaching an aft static port, e.g. second static port 210. Although shown and described herein with reference to one aft static port, those skilled in the art will readily appreciate that any suitable number of aft static ports may be utilized on a probe head, e.g. probe head 202.

Those skilled in the art will readily appreciate that an annular depression, e.g. annular depression 206, can be produced during a probe contour turning process. The annular depression only slightly modifies the standard profile, and therefore does not require major changes to the probe production methods.

Although turbulence inducing surface is shown and described below as serrated surface 106 and/or an annular depression 206, those having skill in the art will readily appreciate that any suitable combinations or variations of these two types of turbulence inducing surfaces, or any other suitable type of turbulence inducing surface can be used without departing from the spirit and scope of the invention. In addition, those skilled in the art will readily appreciate that annular depression 206 and serrated surface 106 do not depend on mounting hardware or adhesives, as is the case with known tape trips and vortex generators.

The methods and systems of the present invention, as described above and shown in the drawings, provide for air data probes with superior properties including reducing or controlling boundary layer separation for consistent readings at low Re conditions typically consisting of high altitudes, Mach number, and angle of attack. While the apparatus and methods of the subject invention have been shown and described with reference to certain embodiments, those skilled in the art will readily appreciate that changes and/or modifications may be made thereto without departing from the spirit and scope of the subject invention.

What is claimed is:

1. An air data probe comprising:
a probe head, the probe head defining a longitudinal axis with a forward tip;
a turbulence inducing surface defined in the probe head aft of the forward tip, wherein the turbulence inducing surface is configured and adapted to trip a fluid boundary layer passing over the probe head to transition from laminar to turbulent for reducing boundary layer separation for consistent readings at high altitudes; and
a first static port proximate the forward tip and a second static port aft the first static port, wherein the turbulence inducing surface is defined therebetween, and wherein the turbulence inducing surface is a single annular depression around the probe head.

2. The air data probe as recited in claim 1, wherein the turbulence inducing surface is defined proximate the forward tip.

3. The air data probe as recited in claim 1, wherein the turbulence inducing surface is configured and adapted to trip a fluid boundary layer at low Reynolds numbers on the order of $10^5$.

4. The air data probe as recited in claim 1, wherein the turbulence inducing surface is configured and adapted to trip a fluid boundary layer at a speed of approximately Mach 0.9.

5. The air data probe as recited in claim 1, wherein the turbulence inducing surface is configured and adapted to trip a fluid boundary layer at an angle of attack.

6. An air data probe comprising:
a probe head, the probe head defining a longitudinal axis with a forward tip; and
a serrated surface defined in the probe head aft of the forward tip, wherein the serrated surface includes at least one of peaks, raised features, and valleys, wherein the serrated surface includes serration cuts at opposing angles, wherein the serration cuts have a generally constant geometry, and wherein the serrated surface is configured and adapted to trip a fluid boundary layer passing over the probe head to transition from laminar to turbulent for reducing boundary layer separation for consistent readings at high altitudes.

7. The air data probe as recited in claim 6, wherein the serrated surface is arranged in a strip defined along a surface of the probe head in an axial direction.

8. The air data probe as recited in claim 6, wherein the serrated surface is arranged in opposing strips each defined along a surface of the probe head in an axial direction.

9. The air data probe as recited in claim 6, further comprising a first static port aft the forward tip and a second static port aft the first static port, wherein the serrated surface is arranged in a strip defined along a surface of the probe head in an axial direction 90 degrees from the static ports.

10. The air data probe as recited in claim 6, further comprising a first static port aft the forward tip and a second static port aft the first static port, wherein the serrated surface extends from proximate the forward tip to proximate the second static port.

11. The air data probe as recited in claim 6, wherein the serrated surface is configured and adapted to trip a fluid boundary layer at low Reynolds numbers on the order of $10^5$.

12. The air data probe as recited in claim 6, wherein the serrated surface is configured and adapted to trip a fluid boundary layer at a speed of approximately Mach 0.9.

13. The air data probe as recited in claim 6, wherein the serrated surface is configured and adapted to trip a fluid boundary layer at an angle of attack.

14. The air data probe as recited in claim 6, wherein the serrated surface is arranged circumferentially around the probe head.

15. The air data probe as recited in claim 1, wherein the annular depression is defined in a lateral plane, wherein the lateral plane is perpendicular to the longitudinal axis.

16. The air data probe as recited in claim 1, wherein the annular depression has a generally constant geometry around the probe head.

* * * * *